(12) United States Patent
Clerckx et al.

(10) Patent No.: US 8,976,850 B2
(45) Date of Patent: Mar. 10, 2015

(54) METHOD AND APPARATUS FOR SHARING CHANNEL STATE INFORMATION (CSI) IN A MULTIPLE-USER MULTIPLE-INPUT MULTIPLE-OUTPUT (MU-MIMO) ENVIRONMENT

(75) Inventors: Bruno Clerckx, Seoul (KR); Jun Il Choi, Seoul (KR); Taejoon Kim, West Lafayette, IN (US); Obadamilola Aluko, Lafayette, IN (US); David J. Love, West Lafayette, IN (US)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 937 days.

(21) Appl. No.: 12/982,329

(22) Filed: Dec. 30, 2010

(65) Prior Publication Data
US 2011/0222625 A1 Sep. 15, 2011

Related U.S. Application Data

(60) Provisional application No. 61/312,819, filed on Mar. 11, 2010, provisional application No. 61/312,735, filed on Mar. 11, 2010.

(30) Foreign Application Priority Data

Jul. 13, 2010 (KR) .................. 10-2010-0067552

(51) Int. Cl.
*H04B 3/46* (2006.01)
*H04B 17/00* (2006.01)
(Continued)

(52) U.S. Cl.
CPC ........ *H04L 25/03343* (2013.01); *H04B 7/0626* (2013.01); *H04L 25/0204* (2013.01); *H04L 2025/03426* (2013.01); *H04L 2025/03808* (2013.01)
USPC ........... 375/228; 375/213; 375/221; 375/285; 375/347; 375/358

(58) Field of Classification Search
USPC ................. 375/130, 140, 147, 148, 211–213, 375/219–221, 224–228, 259–260, 285, 375/295–296, 316, 346–349
See application file for complete search history.

(56) References Cited

U.S. PATENT DOCUMENTS 7,006,848 B2   2/2006   Ling et al.
7,865,800 B2 * 1/2011   Hunter et al. ................. 714/758
(Continued)

FOREIGN PATENT DOCUMENTS

KR   10-2009-0115781   11/2009
KR   10-2010-0005650   1/2010
WO   WO 2009/107090   9/2009

OTHER PUBLICATIONS

David. J. Love et al., "Exchanging Third-Party Information in a Network," UCSD ITA Workshop, Jan. 29-Feb. 2, 2007.

*Primary Examiner* — Sam K Ahn
*Assistant Examiner* — James M Perez
(74) *Attorney, Agent, or Firm* — NSIP Law (57) ABSTRACT

Provided is a channel state information (CSI) sharing method and apparatus in a Multiple User Multiple Input Multiple Output (MU-MIMO) environment. Each node may use network-coding to reduce overhead necessary for sharing CSI between all nodes in the MU-MIMO environment. A transmitter may dynamically select, based on the CSI between receivers, a path used for transmitting data to each receiver and a receiver to be used as a relay based on the global CSI. A decoding performance may be improved based on the CSI between the transmitter and the receivers.

21 Claims, 6 Drawing Sheets

(51) Int. Cl.
*H04Q 1/20* (2006.01)
*H04L 25/03* (2006.01)
*H04B 7/06* (2006.01)
*H04L 25/02* (2006.01)

(56) References Cited

U.S. PATENT DOCUMENTS

| | | | |
|---|---|---|---|
| 8,205,132 B2 * | 6/2012 | Lo et al. | 714/755 |
| 8,495,456 B2 * | 7/2013 | Sze et al. | 714/755 |
| 8,542,579 B2 * | 9/2013 | Rong et al. | 370/229 |
| 2003/0125040 A1 | 7/2003 | Walton et al. | |
| 2005/0041750 A1 | 2/2005 | Lau | |
| 2007/0218917 A1 * | 9/2007 | Frederiksen et al. | 455/450 |
| 2008/0144666 A1 * | 6/2008 | Ross et al. | 370/477 |
| 2009/0168689 A1 * | 7/2009 | Itagaki et al. | 370/315 |
| 2010/0035627 A1 * | 2/2010 | Hou et al. | 455/452.2 |
| 2011/0159799 A1 * | 6/2011 | Chen et al. | 455/3.01 |
| 2012/0184306 A1 * | 7/2012 | Zou et al. | 455/458 |
| 2013/0235793 A1 * | 9/2013 | Lin et al. | 370/315 |

* cited by examiner

METHOD AND APPARATUS FOR SHARING CHANNEL STATE INFORMATION (CSI) IN A MULTIPLE-USER MULTIPLE-INPUT MULTIPLE-OUTPUT (MU-MIMO) ENVIRONMENT

CROSS-REFERENCE TO RELATED APPLICATION(S)

This application claims the benefit under 35 U.S.C. §119(e) of U.S. Provisional Application Nos. 61/312,819 and 61/312,735, both of which were filed on Mar. 11, 2010, in the U.S. Patent and Trademark Office, and the benefit under 35 U.S.C. §119(a) of Korean Patent Application No. 10-2010-0067552, filed on Jul. 13, 2010, in the Korean Intellectual Property Office, the entire disclosures of which are each incorporated herein by reference for all purposes.

BACKGROUND

1. Field

The following description relates to a channel state information (CSI) sharing method and apparatus in a multiple-user multiple-input multiple-output (MU-MIMO) environment.

2. Description of Related Art

A Multiple Input Multiple Output (MIMO) system may provide a greater number of advantages in comparison to a single antenna system. Some of the advantages include, for example, a higher data transmission rate, an improved reliability, and the like. A multiple-user MIMO (MU-MIMO) system where a base station communicates with multiple terminals may provide an even more improved data transmission rate and an improved reliability.

However, interference between terminals may occur in the MU-MIMO system. To reduce interference, a base station and each of the terminals may be made aware of all channel state information (CSI) in the MU-MIMO system. However, a great amount of overhead is needed in order to share the CSI with the base station and each of the terminals.

SUMMARY

In one general aspect, there is provided a communication method of a transmitter in a multiple-user multiple-input multiple-output (MU-MIMO) environment, the method comprising receiving quantized first channel state information (CSI) associated with a first channel that is established between the transmitter and a first receiver, receiving quantized second CSI associated with a second channel that is established between the transmitter and a second receiver, receiving, from the first receiver, first network coding information generated by network-coding of the quantized first CSI and quantized third CSI, wherein the third CSI is CSI associated with a third channel that is established between the first receiver and the second receiver, and obtaining the quantized third CSI based on the first network coding information and the quantized first CSI.

The method may further comprise determining a path used for transmitting data to the first receiver based on the quantized first CSI, the quantized second CSI, and the quantized third CSI.

The receiving of the first network coding information may comprise receiving the first network coding information in response to broadcasting of the first network coding information by the first receiver.

The obtaining of the quantized third CSI may comprise obtaining the quantized third CSI by network-decoding the quantized first CSI and the first network coding information, in response to the reception of the first network coding information.

The method may further comprise precoding data to be transmitted to the first receiver and the second receiver based on the quantized first CSI, the quantized second CSI, and the quantized third CSI.

Each of the quantized first CSI, the quantized second CSI, and the quantized third CSI may include channel quality information (CQI) of a corresponding channel, wherein the CQI has a first logical value or a second logical value based on whether a magnitude of a corresponding channel vector is less than a predetermined threshold.

Each of the quantized first CSI, the quantized second CSI, and the quantized third CSI may include channel direction information (CDI) of a corresponding channel, wherein the CDI is quantized based on an m bit unit, and m is a natural number.

The method may further comprise transmitting a pilot signal to the first receiver to enable the first receiver to estimate the first CSI.

The method may further comprise storing the quantized first CSI and the quantized second CSI.

In another aspect, there is provided a communication method of a first receiver in an MU-MIMO environment, the method comprising generating first network coding information by network-coding quantized first CSI and quantized third CSI, wherein the first CSI is CSI associated with a first channel that is established between a transmitter and the first receiver and the third CSI is CSI associated with a third channel that is established between the first receiver and a second receiver, transmitting the first network coding information to the transmitter and the second receiver, receiving, from the second receiver, second network coding information generated by network-coding of quantized second CSI and the third CSI, wherein the second CSI is CSI associated with a second channel that is established between the transmitter and the second receiver, and obtaining the quantized second CSI based on the second network coding information and the quantized third CSI.

The method may further comprise decoding data transmitted from the transmitter to the first receiver using a scheme based on at least one of a limited-coordination zero-forcing (LCZF) decoding scheme, a minimum-mean-square-error (MMSE) decoding scheme, or a limited-coordination maximum-likelihood (LCML) decoding scheme, and the data is decoded based on the first CSI, the quantized second CSI, and the quantized third CSI.

The obtaining may comprise obtaining the quantized second CSI by network-decoding the second network coding information and the quantized third CSI, in response to the reception of the second network coding information.

The transmitting may comprise broadcasting the first network coding information to enable the transmitter and the second receiver to receive the first network coding information.

The method may further comprise receiving, from the second receiver, a quantized second reception signal, wherein the second reception signal is a signal that the second receiver receives from the transmitter.

In another aspect, there is provided a transmitter in an MU-MIMO environment, the transmitter comprising a storage unit to store quantized first CSI and quantized second CSI, wherein the first CSI is CSI associated with a first channel that is established between the transmitter and a first receiver, and the second CSI is CSI associated with a second channel that is established between the transmitter and a second receiver, a receiving unit to receive, from the first receiver, first network coding information generated by network-coding of the quantized first CSI and quantized third CSI, wherein the third CSI is CSI associated with a third channel that is established between the first receiver and the second receiver, and a processing unit to obtain the quantized third CSI based on the first network coding information and the quantized first CSI.

The processing unit may comprise a path setting unit to determine a path used for transmitting data to the first receiver based on the quantized first CSI, the quantized second CSI, and the quantized third CSI.

The receiving unit may receive the first network coding information in response to broadcasting of the first network coding information by the first receiver.

The processing unit may comprise a network decoding unit to obtain the quantized third CSI by network-decoding of the stored quantized first CSI and the first network coding information, in response to the reception of the first network coding information.

The processing unit may comprise a precoding unit to perform precoding of data to be transmitted to the first receiver and the second receiver, based on the quantized first CSI, the quantized second CSI, and the quantized third CSI.

The transmitter may further comprise a transmitting unit to transmit a pilot signal to the first receiver to enable the first receiver to estimate the first CSI.

In another aspect, there is provided a base station for generating global channel state information (CSI) for a multi-user multiple-input multiple-output (MU-MIMO) network, the base station comprising a storage unit to store quantized first channel state information (CSI) about a first channel that is established between the base station and a first receiver, and to store quantized second CSI about a second channel that is established between the transmitter and a second receiver, a receiving unit to receive first network coding information based on the quantized first CSI and to receive quantized third CSI about a third channel that is established between the first receiver and the second receiver, and a processing unit to obtain the quantized third CSI based on the first network coding information and the quantized first CSI.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
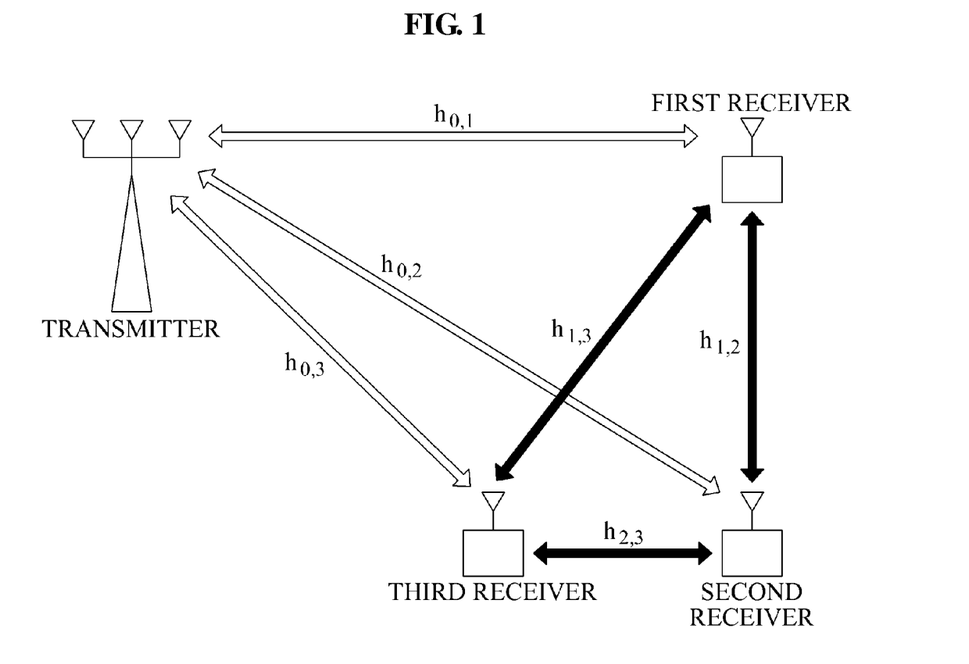
FIG. 1 is a diagram illustrating an example of a Multiple-User Multiple-Input Multiple-Output (MU-MIMO) system including a transmitter and three receivers.

FIG. 1 illustrates an example of a Multiple-User Multiple-Input Multiple-Output (MU-MIMO) system including a transmitter and three receivers.

Referring to FIG. 1, the MU-MIMO system includes a transmitter, a first receiver, a second receiver, and a third receiver. For example, the transmitter, the first receiver, the second receiver, and the third receiver may be nodes of the MU-MIMO system, and may have indexes of 0, 1, 2, and 3, respectively.

Channel state information (CSI) from one node and another node may be obtained based on a pilot signal or based on feedback with respect to the pilot signal. For example, the transmitter may receive CSI respectively fed back from the receivers. For example, the CSI may be CSI associated with channels $h_{0,1}$, $h_{0,2}$, and $h_{0,3}$, which are established between the transmitter and each of the receivers, respectively.

For example, the CSI may generated by the first receiver may include channel state information about the channel $h_{0,1}$ that is established between the first receiver and the transmitter.

However, it may be difficult for the transmitter to obtain CSI associated with a channel ($h_{1,2}$) from the first receiver to the second receiver. These channels that are not directly connected to a node may be referred to as a third-party channel. As described herein, CSI between all nodes may be referred to as global CSI and CSI between one node and each of remaining nodes may be referred to as local CSI.

Each of the nodes may broadcast local CSI of a corresponding node to remaining nodes. Accordingly, each node may obtain global CSI. However, this method may not be an optimal method because various CSI may be redundantly transmitted. Various examples described herein provide methods for decreasing the number of transmissions performed by the all nodes while still obtaining the global CSI.

Referring to FIG. 1, third-party channels from a view of a transmitter are indicated by black bold-line arrows.

For example, a time-division duplexing (TDD) scheme may estimate a channel from one node to another node using pilot transmission, based on reciprocity. As another example, a frequency-division duplexing (FDD) scheme may estimate a channel between one node and another node based on a feedback from the other node.

When each node has the global CSI, the performance of a communication system may be improved in many respects. For example, when the transmitter transmits data to a predetermined receiver, the transmitter may use the global CSI to use one or more of the remaining receivers as intermediate nodes in order to generate an optimal transmission path. A scheduling algorithm that may transmit data at an optimal transmission rate and optimal reliability may be developed based on the global CSI. An improved decoder may be designed based on the global CSI.

Examples herein describe the FDD scheme in addition to TDD scheme. According to various examples, a channel between nodes may be represented by several bits, instead of being represented by a single bit based on a good or bad state of the channel. Therefore, each of the nodes may obtain more information, such as channel direction information (CDI), and the like.

For example, a quasi-optimal method where each of the nodes obtains third-party CSI based on coded transmission may be provided. For example, each of the nodes may effectively obtain the global CSI using a redundancy and a correlation of CSI and by encoding information shared by nodes.

Channel Model

In this example, a MU-MIMO system with a single transmitter including $N_T$ antennas communicates with K receivers. Each of the receivers may include $N_R$ antennas.

For ease of description, it is assumed that each receiver includes one antenna, namely, $N_R=1$. However, the method to be described may be applied to examples where one or more receivers include multiple antennas. Hereinafter, the transmitter and the receivers may be referred to as nodes. Accordingly, in this example the MU-MIMO system includes K+1 nodes.

Each node may transmit a pilot signal, and each node that receives the pilot signal may estimate a channel from the node that transmits the pilot signal. A channel from a node i to a node j may be expressed as $h_{ij}$. $h_{ij} \in \mathbb{C}^{1 \times N_T}$ and $h_{ij}$ may be expressed as CN (0,1).

In this example, the transmitter is referred to as a node 0, and indexes of the receivers are referred to as 1 through N, respectively. In this example, each node is aware of its own local CSI. In a TDD scheme, $h_{ij}=h_{ji}$, based on reciprocity. In a FDD scheme, the node i may estimate a channel from the node j, and may feed back CSI with respect to the estimated channel. Accordingly, the node i may obtain the local CSI. For example, a channel from the node j to the node i and a channel from the node i to the node j may be expressed by $h_{i,j}$ as given below.

$$h_{i,j}=[h_{ji},h_{ij}]$$

In the TDD scheme, $h_{ij}=h_{ji}$ and thus, $h_{i,j}=h_{ij}$. In the FDD scheme, a concatenation sequence with respect to i, j=0, ..., K is predetermined, and thus, $h_{i,j}=h_{j,i}$. In the FDD scheme, for example, a concatenation sequence of channel vectors in $h_{i,j}$ may be $h_{i,j}=[h_{ij},h_{ji}]$ when i<j, and the concatenation sequence of the channel vectors in $h_{i,j}$ may be $h_{i,j}=[h_{ji},h_{ij}]$ when i>j.

Therefore, local CSI of the node i may include CSI associated with a channel from the node i to remaining nodes or CSI associated with a channel from the remaining nodes to the node i. For example, the local CSI of the node i may be expressed by a vector format as given below.

$$\underline{h}_i=[h_{0,i},h_{1,i},\ldots,h_{i-1,i},h_{i+1,i}\ldots h_{K,i}].$$

For example, local CSI of the node 0 which is the transmitter may be $\underline{h}_0=[h_{0,1},h_{0,2},h_{0,3}]$.

Although full CSI may be ideal, quantized CSI may be used, for example, if there is a limited amount of feedback. In this example, the local CSI may be quantized based on a mutual codebook that may be available in the node i. Therefore, the node i may quantize $\underline{h}_i$ as shown below.

$$Q(\underline{h}_i) = [Q(h_{0,i}), Q(h_{1,i}), \ldots, Q(h_{K,i})] \equiv$$
$$[b_{0,i}, b_{1,i}, \ldots, b_{K,i}]$$
$$= \underline{B}_i \text{ (vector of bits)},$$

In this example, Q(•) denotes a vector-quantization with respect to a codebook F. Also in this example, $\underline{B}_i$ is a binary vector indicating the local CSI of the node i.

For example, a broadcast channel may be an error-and-delay-free binary broadcast channel (BBC). Therefore, when one node broadcasts via the BBC, remaining nodes may receive the transmitted bit.

As described, each node includes local CSI. The node i may be aware of $\underline{h}_i$ and $\underline{B}_i$. When all the nodes obtain global CSI, each of the nodes obtains $\underline{h}_j$ and $\underline{B}_j$ with respect to all i, namely, i=0, ..., K. For example, one node may obtain all third-party CSI.

According to an example for obtaining the global CSI, each node may broadcast local CSI in the BBC based on an allocated time slot, and all the nodes may obtain the global CSI after performing K(K+1) transmission. For example, the node i may include K local CSI, such as $\underline{B}_i=[b_{0,i},b_{1,i},\ldots,b_{i-1,i}b_{i+1,i},\ldots b_{K,i}]$. Therefore, the node i may perform transmission K times, and the transmission may be repeatedly performed with respect to K+1 nodes. For example, although $b_{0,1}=b_{1,0}$, the node 0 that is the transmitter may transmit $b_{0,1}$ and $b_{1,0}$. In this example it is possible for each node to obtain the global CSI while decreasing a number of transmissions. For example, the number of transmission performed to obtain the same amount of information may decrease by encoding local CSI based on a correlation of local CSI. For example, each node may encode local CSI and may transmit coded bits via the BBC. The local CSI may be mutual local CSI of two nodes. For example, both the transmitter and the first receiver may be aware of $b_{0,1}$. Therefore, the correlation of the local CSI may be used for determining third-party CSI.

In a transmission time slot t, a node k, where k=mod(t−1, K+1), may transmit $$b[t] = b_{mod(k+1,K+1),k} \oplus b_{mod(k+1+\lceil \frac{t}{K+1} \rceil, K+1),k},$$
$$\left(t = 1, \ldots, \frac{K^2-1}{2}\right).$$

In this example, ⊕ denotes an XOR operation with respect to a bit. Also in this example, ⌈a⌉ is a closest number from among integer numbers being greater than or equal to a.

When information broadcasted from the node k is collected, the collected information may be expressed as $B_k$ as given below.

$$B_k = \begin{bmatrix} b[k+1] \\ b[k+1+(K+1)] \\ \vdots \\ b\left[k+1+\left(\frac{K^2-1}{2}\right)\right] \end{bmatrix}$$

In this example, the $i^{th}$ row may indicate b[t] of when t=k+1+i(K+1). In this case, $$\left(i = 0, \ldots, \frac{K^2-1}{2}\right).$$

All local CSI used for obtaining $B_k$ may be expressed by $B_k$.

$$B_k = \begin{bmatrix} b_{mod(k+1,K+1),k} \\ b_{mod(k+2,K+1),k} \\ \vdots \\ b_{mod(k+\frac{K+1}{2},K+1),k} \end{bmatrix}$$

The information may be mutual information of other nodes. In this example, $B(a)_k$ indicates an $a^{th}$ row of $B_k$.

A decoding process to obtain the global CSI may include two operations.

In a first operation, the node j may obtain all local CSI available in $B_{mod(j-k,K+1)}$ with respect to all $$1 \le k \le \frac{K+1}{2}.$$

All local CSI available in all $B_{mod(j-k,K+1)}$ may be obtained by calculating $$B_{mod(j-k,K+1)} = \begin{bmatrix} 0 \\ B_{mod(j-k,K+1)} \end{bmatrix} \oplus A_{mod(j-k,K+1)}.$$

In this example, 0 refers to a row of zeroes, and $\oplus$ may be performed in an entry-wise order.

In this example, $$A_{mod(j-k,K+1)} = Mat\left(B(\max(k-1,1))_{mod(j-k,K+1)} \oplus b_{mod(j-k,K+1),j}, \frac{K+1}{2}\right)$$

and Mat(a,b) denotes a matrix having 'a' rows and 'b' columns

Similarly, in a second operation, the node j may obtain all local CSI available in all $B_{mod(j+k,K+1)}$ with respect to all $$1 \le k \le \frac{K-1}{2}.$$

All of the local CSI available in all $B_{mod(j+k,K+1)}$ may be obtained by calculating $$B_{mod(j+k,K+1)} = \begin{bmatrix} 0 \\ B_{mod(j+k,K+1)} \end{bmatrix} \oplus C_{mod(j+k,K+1)}.$$

In this example, $$C_{mod(j+k,K+1)} = Mat\left(B\left(\frac{K-1}{2}\right)_{mod(j+k,K+1)} \oplus b_{mod(j+k-(K+1)/2,K+1),mod(j+k,K+1)}, \frac{K+1}{2}\right).$$

According to the two operations, the node j may obtain $B_{mod(j-k,K+1)}$ with respect to $$1 \le k \le \frac{K+1}{2}$$

and $B_{mod(j+k,K+1)}$ with respect to $$1 \le k \le \frac{K-1}{2}.$$

The node j may include $B_k$ with respect to all k. Therefore, the node j may include all local CSI with respect to all the nodes, and thus, node j may determine the global CSI. For example, the global CSI may be calculated as below.

$$B = \bigcup_{k=0}^{K} B_k$$

As described above, the global CSI may be obtained using $$\left\lceil \frac{K^2 - 1}{2} \right\rceil$$

transmission time slots. The described method may decrease a number of transmission time slots in comparison to a method that uses K(K+1) transmission time slots.

The described method is further described with reference to FIG. 2.

Figure 2:
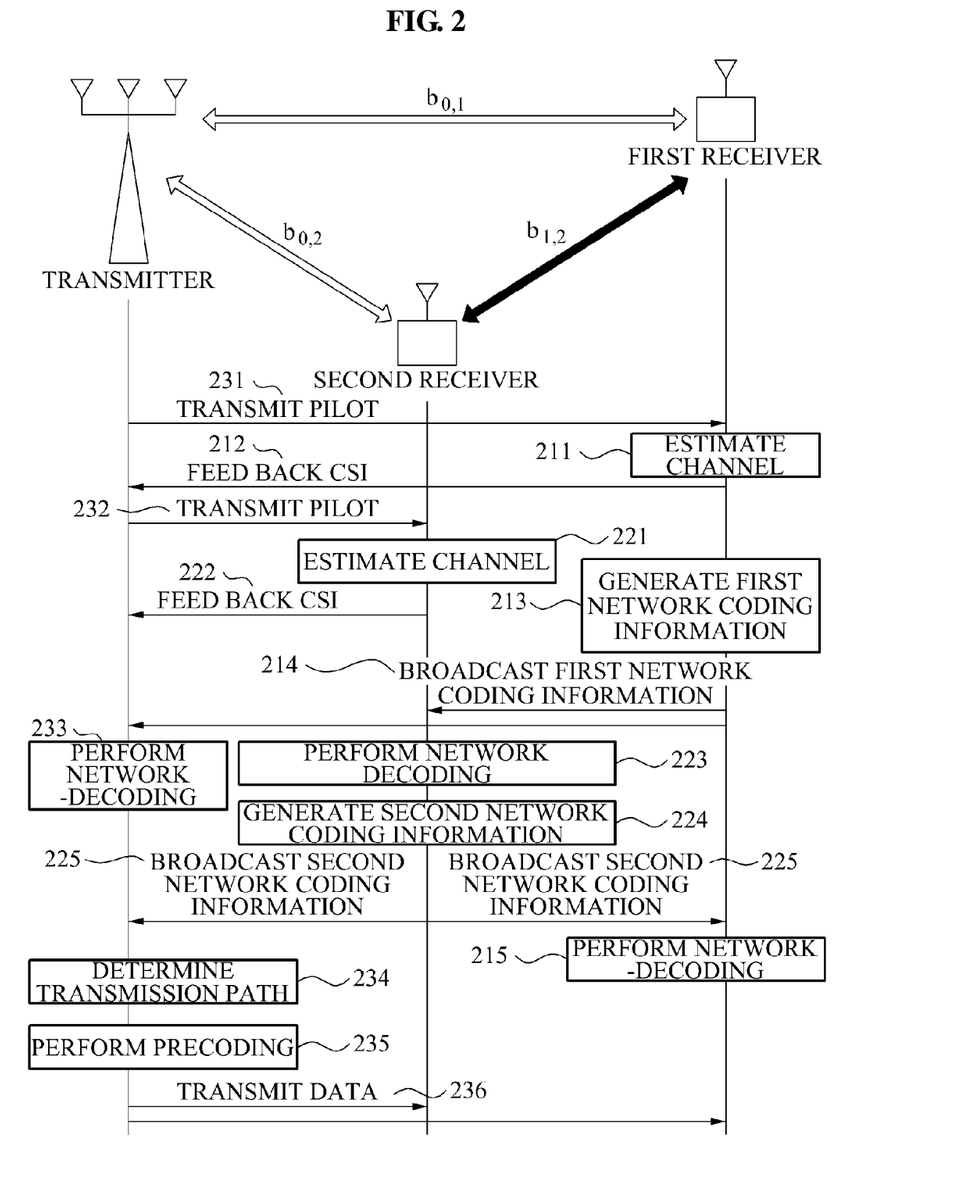
FIG. 2 is a diagram illustrating an example of the operation of a MU-MIMO system including a transmitter, a first receiver, and a second receiver.

FIG. 2 illustrates an example operation of a MU-MIMO system including a transmitter, a first receiver, and a second receiver.

Referring to FIG. 2, the MU-MIMO system includes three nodes, a transmitter, a first receiver, and a second receiver. A method where each of the nodes obtains global CSI is described herein.

The transmitter transmits a pilot to the first receiver, in 231. The first receiver estimates a first channel from the transmitter to the first receiver, in 211. The first receiver quantizes first CSI associated with the estimated first channel, and feeds back the quantized first CSI ($b_{0,1}$) to the transmitter, in 212.

In the same manner, the transmitter transmits a pilot signal to the second receiver, in 232. The second receiver estimates a second channel from the transmitter to the second receiver, in 221. The second receiver quantizes second CSI associated with the second channel and feeds back the quantized second CSI ($b_{0,2}$) to the transmitter, in 222.

Therefore, the transmitter may obtain local CSI of the transmitter, for example, $b_{0,1}$ and $b_{0,2}$.

The first receiver generates first network coding information by network-coding of $b_{0,1}$ and quantized third CSI ($b_{1,2}$) associated with a third channel between the first receiver and the second receiver, in 213. Third CSI may be CSI associated with the third channel between the first receiver and the second receiver.

The first receiver transmits the first network coding information to the transmitter and the second receiver, in 214. For example, the first receiver may broadcast the first network coding information via a BBC.

The transmitter may obtain $b_{1,2}$ based on the first network coding information and $b_{0,1}$. The transmitter obtains $b_{1,2}$ by network-decoding $b_{0,1}$ and the first network coding information, in 233.

The second receiver may obtain $b_{0,1}$ by network-decoding the first network coding information and $b_{1,2}$.

The second receiver generates second network coding information by network-coding of $b_{2,0}$ and $b_{2,1}$. The second receiver broadcasts, via the BBC, the second network coding information to the transmitter and the first receiver, in 225.

The first receiver obtains $b_{2,0}$ by network-decoding of the second network coding information and $b_{1,2}$, in 215.

Accordingly, the transmitter, the first receiver, and the second receiver may obtain the global CSI.

The transmitter determines a path used for transmitting data to each of the receivers based on the global CSI, for example, $b_{0,1}$, $b_{0,2}$ and $b_{1,2}$, in 234. The transmitter may set a predetermined receiver as a relay to transmit data to another receiver.

The transmitter performs precoding based on the global CSI, in 235. The transmitter transmits, to the first receiver and the second receiver, data generated by precoding, in 236.

Hereinafter, the described operations may be described based on Equations.

Table 1 illustrates examples of third-party CSI used for obtaining global CSI and corresponding local CSI known to each of the transmitter, the first receiver, and the second receiver.

TABLE 1

|  | Known value | Desired value |
|---|---|---|
| Transmitter | $b_{0,1}$ and $b_{0,2}$ | $b_{1,2}$ |
| First receiver | $b_{1,0}$ and $b_{1,2}$ | $b_{0,2}$ |
| Second receiver | $b_{2,0}$ and $b_{2,1}$ | $b_{0,1}$ |

As shown in Table, the transmitter is aware of $b_{0,1}$ and $b_{0,2}$, and may desire $b_{1,2}$. The first receiver is aware of $b_{1,0}$ and $b_{1,2}$, and may desire $b_{0,2}$. The second receiver is aware of $b_{2,0}$ and $b_{2,1}$, and may desire $b_{0,1}$.

When local CSI known by each of the transmitter, the first receiver, and the second receiver is broadcasted via the BBC, six transmission time slots are used in total. The transmitter may broadcast $b_{0,1}$ and $b_{0,2}$ based on two time slots, the first receiver may broadcast $b_{1,0}$ and $b_{1,2}$ based on two time slots different from the transmitter, and the second receiver may broadcast $b_{2,0}$ and $b_{2,1}$ based on two time slots different from the first receiver.

However, as described herein the number of transmission time slots used by the transmitter, the first receiver, and the second receiver to obtain the global CSI may be reduced. A coding method to reduce the transmission time slots is shown in Table 2.

TABLE 2

|  |  |  | Decoding by transmitter | Decoding by first receiver | Decoding by second receiver |
|---|---|---|---|---|---|
| Time slot | t1 | First receiver transmits $b_{1,0} \oplus b_{1,2}$ | $b_{1,0} \oplus b_{1,2} \oplus b_{0,1} = b_{1,2}$ |  | $b_{1,0} \oplus b_{1,2} \oplus b_{2,1} = b_{0,1}$ |
|  | t2 | Second receiver transmits $b_{2,0} \oplus b_{2,1}$ |  | $b_{2,0} \oplus b_{2,1} \oplus b_{1,2} = b_{0,2}$ |  |

The first receiver may broadcast $b_{1,0} \oplus b_{1,2}$ via the BBC based on a single time slot instead of broadcasting $b_{0,1}$ and $b_{0,2}$ in two time slots. The $\oplus$ refers to an XOR operation. The second receiver may broadcast $b_{2,0} \oplus b_{2,1}$ based on a single time slot. The transmitter may not broadcast a signal. Therefore, only two time slots may be used to obtain the global CSI for the transmitter, the first receiver, and the second receiver as opposed to six time slots.

For example, to obtain third CSI with respect to the transmitter, the transmitter may decode $b_{1,0} \oplus b_{1,2}$ transmitted from the first receiver. In this example, the transmitter may be already aware of $b_{0,1}$, because $b_{0,1}$ may be the same as $b_{1,0}$, and thus, the transmitter may obtain $b_{1,2}$ based on $b_{1,2} = b_{1,0} \oplus b_{1,2} \oplus b_{0,1}$. Similarly, the first receiver may decode $b_{2,0} \oplus b_{2,1}$ transmitted from the second receiver to obtain $b_{0,2}$. The second receiver may decode $b_{1,0} \oplus b_{1,2}$ transmitted from the first receiver to obtain $b_{0,1}$. It should be appreciated that another combination of transmission nodes may provide the same result, based on the same coding method. For example, the MU-MIMO system may include one or more transmitters and one or more receivers. The transmitters may correspond to, for example, a mobile terminal, a base station, a relay, and the like. The receivers may correspond to, for example, a mobile terminal, a base station, a relay, and the like.

For example, the coding method may be generalized to any MU-MIMO system that includes N+1 nodes. For example, the coding method may be applicable to the MU-MIMO system including one transmitter and N receivers. As described by the examples herein, the transmitter and each of the nodes may obtain the global CSI based on $$\left\lceil \frac{K^2 - 1}{2} \right\rceil$$

transmission time slots in total. Therefore, the number of transmission time slots used for obtaining the global CSI may be reduced from K(K+1) to $$\left\lfloor \frac{(K+1)^2}{2} \right\rfloor.$$

Possible Types of Third-Party CSI to be Quantized

Information to be shared between the transmitter and each of the receivers may be different depending on cases.

For example, information to be shared may be '0' or '1' based on a good or bad state of a channel. In this example, $b_{i,j}$ may be determined as given below.

$$b_{i,j} = \begin{cases} 0, & \text{if } \|h_{i,j}\| \leq \beta_{threshold} \\ 1, & \text{if } \|h_{i,j}\| > \beta_{threshold} \end{cases}$$

In this example, $b_{i,j} \in \{0,1\}$, $\beta_{threshold}$ and denotes a predetermined threshold determining a good or a bad state of the channel. In this example, $b_{i,j}$ denotes channel quality information (CQI). For example, the CQI may be composed of several bits.

As another example, the information to be shared may be channel direction information (CDI). In this example, $b_{i,j} = Q(h_{i,j})$. Also in this example, $b_{i,j} \in \{0,1\}^m$ and m is a number of bits used for quantizing the channel.

It should be appreciated that the above described method may be applicable to other types of information when a pair of nodes has mutual information.

Hereinafter, a method of a transmitter determining a data transmission path is described and a method of receivers decoding data transmitted from the transmitter is described under assumption that each of the transmitter and the receivers has global CSI.

Figure 3:
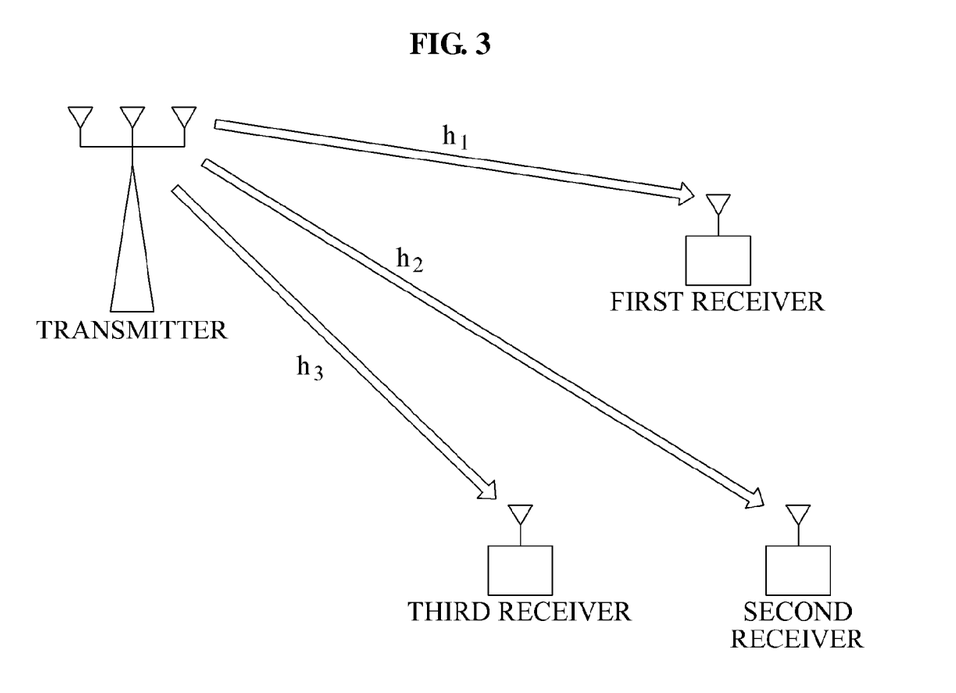
FIG. 3 is a diagram illustrating an example of MU-MIMO broadcasting channels.

FIG. 3 illustrates an example of MU-MIMO broadcasting channels.

Referring to FIG. 3, the MU-MIMO system includes a transmitter, a first receiver, a second receiver, and a third receiver.

In this example, the transmitter includes $N_T$ antennas and the transmitter communicates with K receivers. Each of the K receivers includes $N_R$ antennas.

For example, a channel between the transmitter and each of the receivers may be a flat-fading Rayleigh model. For ease of description, each receiver includes a single antenna, namely, $N_R=1$, however, receivers are not limited thereto. In a downlink, a reception signal ($y_k$) of a $k^{th}$ receiver may be given as below.

$$y_k = \sqrt{E_s/K}\, h_k^* f_k s_k + h_k^* \sum_{\substack{j=1 \\ j \neq k}}^{K} f_j s_j + n_k$$

In this example, $E_s$ denotes a transmission power of the transmitter, $h_k$ denotes a channel from the transmitter to the $k^{th}$ receiver, and $h_k \in N_T \times 1$. $h_k$ may be distributed as CN (0,1), and may be Independent and Identically Distributed (i.i.d.). $f_k$ denotes a unit-norm vector satisfying $f_k \in N_T \times 1$, and denotes a precoder used in the transmitter for the $k^{th}$ receiver. $s_k \in A$ denotes a transmission symbol for the $k^{th}$ receiver, and $E[s_k^* s_k] = 1$. $n_k$ denotes an additive white Gaussian noise (AWGN) applied in the $k^{th}$ receiver, may be distributed as CN(0,1), with respect to all the receivers, and may be i.i.d.

For example, when signals received by the receivers are grouped based on a vector y, the vector of the received signals may be expressed as given below.

$$y = \begin{bmatrix} y_1 \\ y_2 \\ \vdots \\ y_K \end{bmatrix}$$

$$= \sqrt{\frac{E_s}{K}} \underbrace{\begin{bmatrix} h_1^* \\ h_2^* \\ \vdots \\ h_K^* \end{bmatrix}}_{H} \underbrace{[f_1 \; f_2 \; \cdots \; f_K]}_{F} \underbrace{\begin{bmatrix} s_1 \\ s_2 \\ \vdots \\ s_K \end{bmatrix}}_{s} + \underbrace{\begin{bmatrix} n_1 \\ n_2 \\ \vdots \\ n_K \end{bmatrix}}_{n \sim CN(0,I)}$$

$$= \sqrt{\frac{E_s}{K}}\, HFs + n.$$

In this example, $H_e = HF$, $H_e$ may include an effect of pre-processing with respect to a downlink channel in the transmitter. It should be appreciated that any form of precoding can be used. Rows of $H_e$ denote equivalent channels from a transmitter to corresponding receivers. Therefore, an equivalent channel ($h_{k,e}$) with respect to the $k^{th}$ receiver may be a $k^{th}$ row of $H_e$. For example, $h_{k,e}$ may be as given below.

$$h_{k,e} = h_k^* F$$

It is assumed that each receiver fully estimates a corresponding equivalent channel. For example, the equivalent channel may be established using a pilot signal transmitted from the transmitter. For example, each receiver may quantize the equivalent channel based on a mutual codebook among all the receivers. The quantization of each receiver may be performed as given below.

$$\hat{h}_{k,e} = \underset{g \in G}{\mathrm{argmax}} |\tilde{h}_{k,e} g|^2$$

In this example, $\tilde{h}_{k,e}$ is a unit-norm equivalent channel vector, namely, $\tilde{h}_{k,e} = h_{k,e}/\|h_{k,e}\|$. Also in this example, G is a mutual quantization codebook of all the receivers.

In an environment where the receivers provide limited coordination, the receivers may share information associated with a limited rate via a BBC. For example, the BBC may be used by one user per time. The remaining users may obtain broadcasted data without errors when one user performs broadcasting via the BBC. An equivalent channel from the transmitter to a predetermined receiver may be third-party CSI to remaining receivers.

Figure 4:
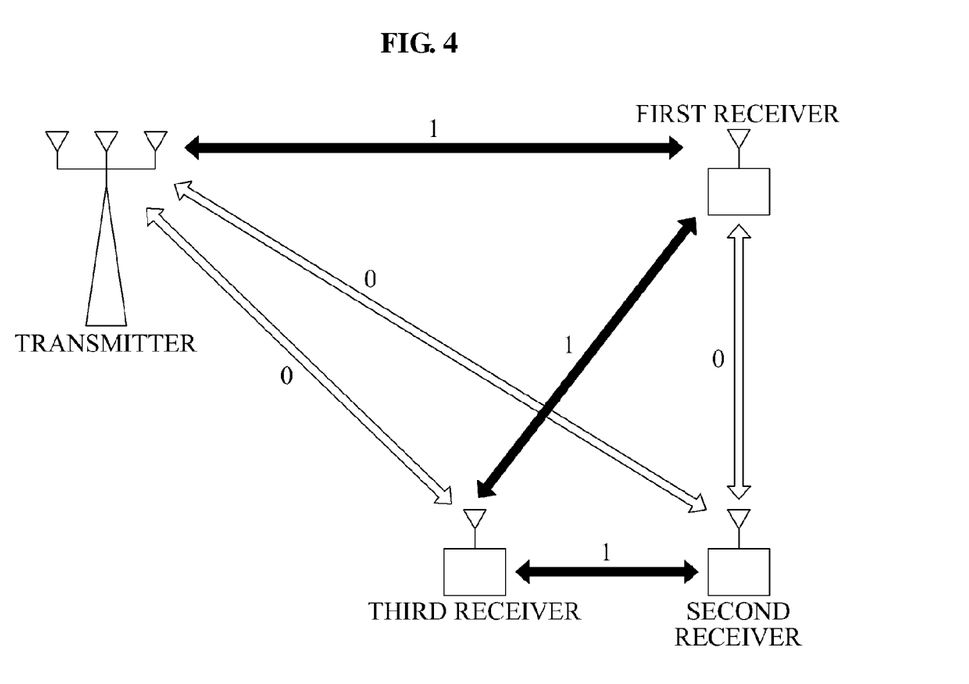
FIG. 4 is a diagram illustrating an example of a MU-MIMO relay system.

FIG. 4 illustrates an example of an MU-MIMO relay system.

Global CSI may be used in the MU-MIMO relay system in which receivers operate as relays when the transmitter transmits information.

Referring to FIG. 4, the MU-MIMO relay system includes the transmitter, a first receiver, a second receiver, and a third receiver. FIG. 4 illustrates an example of a route from the transmitter to the second receiver that may be a sink receiver, when the first receiver and the third receiver operate as relays.

Referring to FIG. 4, each channel may be represented as '0' or '1' depending on a good or bad state of the channel. The transmitter may be aware of all CSI of the MU-MIMO system. Therefore, the transmitter may dynamically determine a route for transmitting data to the second receiver that is a sink receiver in this example, based on all of the CSI. Referring to FIG. 4 the transmitter transmits the data via channels having CSI of '1'. The transmitter may select a route passing the first receiver and the third receiver and reaching the second receiver. Accordingly, the transmitter may use the first receiver and the third receiver as the relays to transmit the data to the second receiver.

The example of FIG. 4 may be generated, and the generated example may be described based on a case where K receivers exist.

When the transmitter includes global CSI, for example, the transmitter may dynamically transmit data to provide a predetermined quality of service (QoS)

For example, each shared CSI may be a binary decision. The binary decision may be dependent on whether the channel is in a good or bad state. The binary decision (or channel state) may be determined based on various methods. For example, one method may depend on transmission from each node, for example, the transmitter and each of the receivers, and may decide based on whether a signal-to-interference and noise radio (SINR) is equivalent to the threshold. As a result of the decision, the CSI may be in a CQI format.

The transmitter may estimate, with respect to the CQI, channels from each of the receivers. Also, each of the receivers may estimate channels from the transmitter and remaining receivers to the respective receiver. The transmitter and each of the receivers may compare channel norms with respect to the estimated channels with a threshold ($\beta_{threshold}$). For example, $\beta_{threshold}$ may be a predetermined value to obtain a predetermined QoS metric. The binary decision may be performed as given below.

$$b_{i,j} = \begin{cases} 0, & \text{if } \|h_{i,j}\| \le \beta_{threshold} \\ 1, & \text{if } \|h_{i,j}\| > \beta_{threshold} \end{cases}$$

Generally, pre-processing is performed in the transmitter of the MU-MIMO system. Accordingly, the receivers may respectively decode data streams of the receivers. When the transmitter is aware of all CSI, channels may be equivalently decomposed. Therefore, data streams may be parallel-transmitted or transmitted in parallel to the receivers by fully removing interference between users. However, there may be difficulty in providing all CSI to the transmitter. Therefore, feedback of a limited rate may be used for reporting a channel to a receiver. However, when significantly insufficient feedback is used, interference between users may remain and the interference may significantly deteriorate a performance of decoding by the receivers.

Examples herein may be described based on the limited-coordination among receivers, and thus, the performance of decoding by the receivers may be significantly improved. For example, the receivers may share quantized information associated with signals received from the transmitter and quantized information associated with channels between receivers, based on the limited-coordination among receivers. The improvement of the performance may provide a low error-rate, and may be obtained by limited coordinated joint processing of cumulatively received signals.

When the transmitter transmits data to a sink receiver, the transmitter may use remaining receivers as relays, and thus, the transmitter may dynamically determine a transmission route. Therefore, the performance of the MU-MIMO relay system may be improved.

Limited-Coordination Decoding Scheme

As an example, the limited-coordination decoding method in an MU-MIMO system may be described based on the described channel model. Collection y of reception signals with respect to all the receivers may be expressed by a vector format as given below.

$$y = \begin{bmatrix} y_1 \\ \vdots \\ y_K \end{bmatrix} = \sqrt{\frac{E_s}{K}} H_e s + n.$$

However, the $k^{th}$ receiver may only receive $y_k = h_{k,e} s + n_k$ from the transmitter. Unless interference is completely removed from the transmitted signal and coordination of the receivers is provided, interference may occur among the receivers. This may cause a decrease in the decoding performance of the receiver. Described herein is a limited-coordination decoding method that may improve the performance of decoding.

Each of the receivers may fully estimate an equivalent channel from the transmitter based on a pilot signal from the transmitter. The quantization may be performed based on a codebook G. For example, the codebook G may be a mutual codebook of all receivers. The quantized equivalent channel $\hat{h}_{k,e}$ may be expressed as given below. For example, the equivalent channel may be expressed as an effective channel.

$$\hat{h}_{k,e} = \underset{g \in G}{\operatorname{argmax}} |\hat{h}_{k,e} g|^2$$

The codebook G may include unit-norm vectors. The codebook G may be designed to match Gaussian distributed vectors. The codebook G may include $2^B$ vectors, and each of the vectors included in the codebook G may be indexed using B bits with respect to information.

As another example, another codebook may be used for quantizing the reception signals of the $k^{th}$ receiver. The other codebook may be a reception signal codebook and may be referred to as a codebook C. Similarly, the codebook C may be a mutual codebook of all the receivers. For example, the quantized reception signal $\hat{y}_k$ may be expressed as given below.

$$\hat{y}_k = \underset{a \in C}{\operatorname{argmin}} |a - y_k|^2$$

For example, $\mathbb{C}$, the codebook C may include $2^L$ elements, and each of the elements may be expressed as L bits with respect to information. The codebooks may be generated based on an LBG-algorithm to match corresponding quantized dimensions.

With respect to the CSI, each of the receivers may generate a CSI vector ($CSI_k$). For example, the $CSI_k$ may be generated by concatenating indexes corresponding to a quantized equivalent channel ($\hat{h}_{k,e}$) and a quantized reception signal ($\hat{y}_k$).

$$CSI_k = [\hat{h}_{k,e}, \hat{y}_k]$$

The $CSI_k$ may be coded and may be shared by the BBC so that each of the receivers may be aware of the global CSI. Each of the receivers may share one or more real numbers with remaining receivers, for example, two real numbers. In this example, the two real numbers may indicate a norm of a channel of the $k^{th}$ receiver and a magnitude of the reception signal of the $k^{th}$ receiver.

Each of the receivers may have all information used for generating quantized cumulative received signal vector ($\hat{y}_k$) and quantized equivalent downlink channel matrix ($\hat{H}_k$). For example, the $k^{th}$ receiver may generate $\hat{y}_k$ as shown below.

$$\hat{y}_k = \begin{bmatrix} \hat{y}_1 \\ \vdots \\ \hat{y}_{k-1} \\ y_k \\ \hat{y}_{k+1} \\ \vdots \\ \hat{y}_K \end{bmatrix} = \begin{bmatrix} \|h_{1,e}\| \hat{h}_{1,e} \\ \vdots \\ \|h_{k-1,e}\| \hat{h}_{k-1,e} \\ h_{k,e} \\ \|h_{k+1,e}\| \hat{h}_{k+1,e} \\ \vdots \\ \|h_{K,e}\| \hat{h}_{K,e} \end{bmatrix} \begin{bmatrix} s_1 \\ \vdots \\ s_{k-1} \\ s_k \\ s_{k+1} \\ \vdots \\ s_K \end{bmatrix} + \begin{bmatrix} \hat{n}_1 \\ \vdots \\ \hat{n}_{k-1} \\ n_k \\ \hat{n}_{k+1} \\ \vdots \\ \hat{n}_K \end{bmatrix} \equiv \hat{H}_k s + \hat{n}_k$$

In the above example, $\hat{n}_k$ may be no longer distributed as CN (0,I), because noise may include a reception signal quantization error and AWGN. However, for ease of description, it is assumed that $\hat{n}_k$ is still distributed as CN (0,I).

Hereinafter, a decoding algorithm based on the global CSI is described.

Limited-Coordination Zero-Forcing (LCZF) Decoding Scheme

The $k^{th}$ receiver may embody an LCZF decoder by generating a pseudo-inverse with respect to $\hat{H}_k$. A data stream for the $k^{th}$ receiver may be extracted. For example, the LCZF decoding scheme may estimate a symbol ($\hat{s}_k$) of the $k^{th}$ receiver as given below.

$$\hat{s}_k = e_k (\hat{H}_k)^\dagger \hat{y}_k$$

In this example, $e_k$ denotes a $k^{th}$ row of K-dimensional unit matrix ($I_K$) and $(\bullet)^\dagger$ denotes a pseudo-inverse function. Therefore, interference from other receivers may be removed based on LCZF.

Minimum-Mean-Square-Error (MMSE) Decoding Scheme

When $\hat{n}_k$ is assumed to be AWGN, the MMSE decoding scheme may be used. For example, according to the MMSE decoding scheme, $\hat{s}_k$ may be estimated as given below.

$$\hat{s}_k = e_k \left( \hat{H}_k^* \hat{H}_k + \frac{K}{E_s} I_K \right)^{-1} \hat{H}_k \hat{y}_k$$

Limited-Coordination Maximum-Likelihood (LCML) Decoding Scheme

The $k^{th}$ receiver may perform joint detection to obtain a $k^{th}$ data symbol. For example, the joint detection may be performed by performing a minimum-distance detection that is equivalent to a maximum-likelihood detection, and $\hat{n}_k$ may be distributed as an ideal AWGN. According to an LSML scheme, $\hat{s}_k$ may be estimated as given below.

$$\hat{s}_{k,ML} = e_k \hat{s}_{k,ML}$$

$$\hat{s}_{k,ML} = \underset{s \in A^K}{\operatorname{argmin}} \left\| \hat{y}_k - \hat{H}_k s \right\|^2$$

Dynamic MU-MIMO Relay System

Hereinafter, MU-MIMO relay system using global CSI is described. In this example, the channels are accurately estimated, and a binary decision may be generated based on a quality of a channel.

$$b_{i,j} \in \{0, 1\}$$

$$b_{i,j} = \begin{cases} 0, & \text{if } \|h_{i,j}\| \leq \beta_{threshold} \\ 1, & \text{if } \|h_{i,j}\| > \beta_{threshold} \end{cases}$$

In this example, $\beta_{threshold}$ is a predetermined constant known to the MU-MIMO system. The transmitter may use all other receivers as relays, to transmit data to the $k^{th}$ receiver.

For a fixed relay route, the transmitter may use the fixed route when transmitting data to a sink receiver. However, the transmitter may dynamically select an optimal route from one receiver to the sink receiver based on the global CSI.

In this example, $P_k$ denotes all possible routes from the transmitter to the $k^{th}$ receiver, $p_{0,k}$ denotes a single fixed route from the transmitter to the $k^{th}$ receiver where $p_{0,k} \in P_k$, and $|p_{0,k}|$ denotes a number of links existing in $p_{0,k}$.

For example, the transmitter is aware of all CSI, and the transmitter may provide an accurate optimal route based on accurate information of links existing in $P_k$. As another example, when less information, such as the binary decision, is used to represent a channel state, a quasi-optimal route ($p_{0,k}$) may be dynamically selected.

$$p_{0,k} = \underset{p \in P_k}{\operatorname{argmax}} \sum_{k=1}^{|p|} \log(1 + \beta_{threshold})$$

For example, the routing may be dynamically performed based on channel realization. Based on the described scheme, the most reliable receivers may be selected as relays of data.

Figure 5:
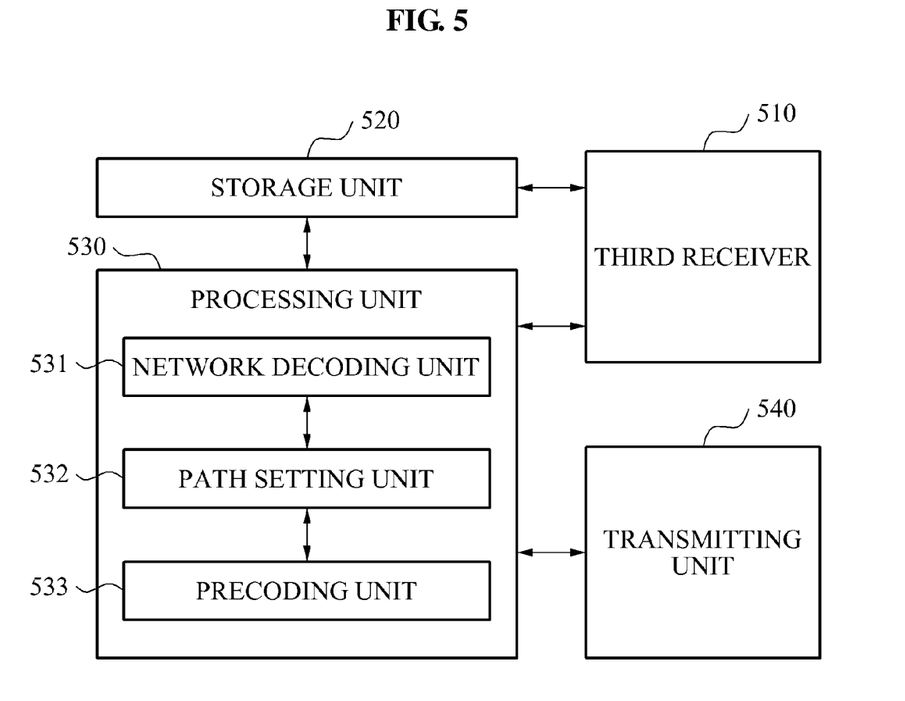
FIG. 5 is a diagram illustrating an example of a transmitter.

FIG. 5 illustrates an example of a transmitter.

Referring to FIG. 5, the transmitter includes a receiving unit 510, a storage unit 520, a processing unit 530, and a transmitting unit 540. In this example, the transmitter may be operated together with a first receiver and a second receiver in an MU-MIMO system.

For example, the receiving unit 510 may receive quantized first CSI associated with a first channel that exists from the transmitter to the first receiver and quantized second CSI associated with a second channel that exists from the transmitter to the second receiver. The receiving unit 510 may receive, from the first receiver, first network coding information generated by network-coding of the quantized first CSI and quantized third CSI. In this example, the third CSI may be CSI associated with a third channel from the first receiver to the second receiver. The receiving unit 510 may receive the first network coding information in response to broadcasting of the first network coding information by the first receiver.

The storage unit 520 may store the quantized first CSI and the quantized second CSI. The processing unit 530 may obtain the quantized third CSI based on the first network coding information and the quantized first CSI. The transmitting unit 540 may transmit a pilot signal and data to the first receiver and the second receiver.

In this example, the processing unit 530 includes a network coding unit 531, a path setting unit 532, and a precoding unit 533. The network coding unit 531 may obtain the quantized third CSI by network-decoding the quantized first CSI and the first network coding information stored in the storage unit 520, in response to the reception of the first network coding information. The path setting unit 532 may determine a path used for transmitting data to the first receiver based on the quantized first CSI, the quantized second CSI, and/or the quantized third CSI. The precoding unit 533 may perform precoding of data to be transmitted to the first receiver and the second receiver based on the quantized first CSI, the quantized second CSI, and/or the quantized third CSI.

While the example of FIG. 5 describes the device as a transmitter, it should be appreciated that the device may also receive data as well and may also be referred to as a receiver or a transceiver.

Figure 6:
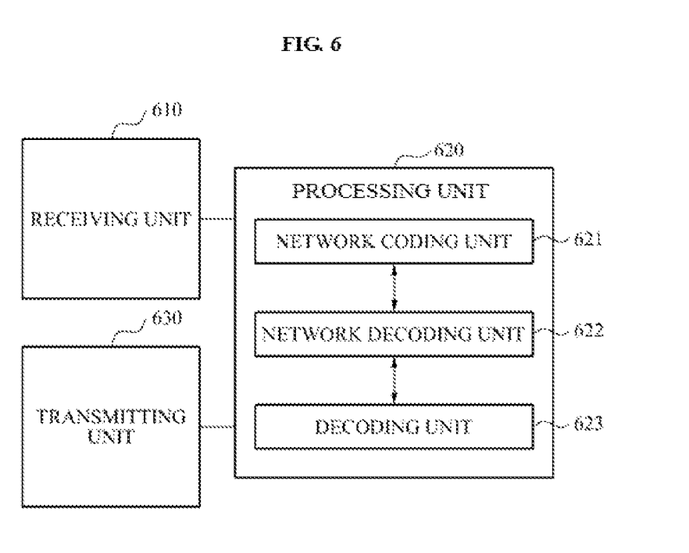
FIG. 6 is a diagram illustrating an example of a receiver.

FIG. 6 illustrates an example of a first receiver.

Referring to FIG. 6, the first receiver includes a receiving unit 610, a processing unit 620, and a transmitting unit 630. In this example, the first receiver may be operated together with a transmitter and a second receiver in an MU-MIMO system.

For example, the receiving unit 610 may receive a pilot signal and data from the transmitter. The receiving unit 610 may receive, from the second receiver, quantized second CSI associated with a second channel from the second receiver to the transmitter. The receiving unit 610 may receive second network coding information generated by network-coding of quantized second CSI and third CSI. The receiving unit 610 may receive, from the second receiver, a quantized second reception signal. For example, the second reception signal may be a signal that the second receiver receives from the transmitter.

The processing unit 620 may process signals received via receivers, and may generate signals to be transmitted via the transmitting unit 630. The processing unit 620 may obtain the quantized second CSI based on the second network coding information and quantized third CSI.

The transmitting unit 630 may transmit first network coding information to the transmitter and the second receiver. The transmitting unit 630 may broadcast the first network coding information to enable the second receiver to receive the first network coding information.

In this example, the processing unit 620 includes a network coding unit 621, a network decoding unit 622, and a decoding unit 623. The network coding unit 621 may generate the first network coding information by network-coding quantized first CSI and the quantized third CSI, wherein the first CSI is associated with a first channel from the first receiver to the transmitter and the third CSI is associated with a third channel from the first receiver to the second receiver. The network decoding unit 622 may obtain the quantized second CSI by network-decoding the second network coding information and the quantized third CSI, in response to the reception of the second network coding information. For example, the decoding unit 623 may decode data transmitted, from the transmitter, to the first receiver using an LCZF decoding scheme, an MMSE decoding scheme, and LCML decoding scheme, based on the first CSI, the quantized second CSI, and the quantized third CSI.

While the example of FIG. 6 describes the device as a receiver, it should be appreciated that the device may also transmit data as well and may also be referred to as a transmitter.

The transmitter and the first receiver according to embodiments have been described. It should be appreciated that the various embodiments described with reference to FIGS. 1 through 4 may be applicable to the transmitter and the first receiver described with reference to FIGS. 5 and 6.

The methods, processes, functions, and software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a transmitter in a multiple-user multiple-input multiple-output (MU-MIMO) environment, the method comprising:

receiving, at the transmitter during a first time period, quantized first channel state information (CSI) of a first channel that is established between the transmitter and a first receiver;

receiving, at the transmitter from the first receiver during a second subsequent time period, network coding information as a single binary piece of data transmitted in a single transaction, the network coding information comprising the quantized first CSI and quantized second CSI that are network-coded, and the second CSI being CSI of a second channel that is established between the first receiver and a second receiver; and obtaining the quantized second CSI, at the transmitter, based on an Exclusive-OR (XOR) operation between the network coding information and the quantized first CSI received during the first time period.

2. The method of claim 1, further comprising:

determining a path used for transmitting data to the first receiver based on the quantized first CSI, the quantized second CSI, and quantized third CSI of a channel established between the transmitter and the second receiver.

3. The method of claim 1, wherein the receiving of the network coding information comprises:

receiving the network coding information in response to the first receiver broadcasting the network coding information.

4. The method of claim 1, wherein the obtaining of the quantized second CSI comprises:

obtaining the quantized second CSI comprising the quantized first CSI and the network coding information being network-decoded, in response to the network coding information being received.

5. The method of claim 1, further comprising:
precoding data to be transmitted to the first receiver and the second receiver based on the quantized first CSI, the quantized second CSI, and quantized third CSI of a channel established between the transmitter and the second receiver.

6. The method of claim 1, wherein each of the quantized first CSI and the quantized second CSI includes channel quality information (CQI) of a corresponding channel, wherein the CQI has a first logical value or a second logical value based on whether a magnitude of a corresponding channel vector is less than a predetermined threshold.

7. The method of claim 1, wherein each of the quantized first CSI and the quantized second CSI includes channel direction information (CDI) of a corresponding channel, wherein the CDI is quantized based on an m bit unit, and m is a natural number.

8. The method of claim 1, further comprising:
transmitting a pilot signal to the first receiver to enable the first receiver to estimate the first CSI.

9. The method of claim 1, further comprising:
storing the quantized first CSI.

10. A communication method of a first receiver in a multiple-user multiple-input multiple-output (MU-MIMO) environment, the method comprising:
generating, by the first receiver, first network coding information comprising quantized first channel state information (CSI) and quantized third CSI being network-coded, wherein the first CSI is CSI of a first channel that is established between a transmitter and the first receiver and the third CSI is CSI of a third channel that is established between the first receiver and a second receiver;
transmitting, by the first receiver, the first network coding information to the transmitter and the second receiver;
receiving, by the first receiver from the second receiver, second network coding information generated by network-coding of quantized second CSI and the third CSI, wherein the second CSI is CSI of a second channel that is established between the transmitter and the second receiver; and
obtaining the quantized second CSI, at the first receiver, based on an Exclusive-OR (XOR) operation between the second network coding information and the quantized third CSI.

11. The method of claim 10, further comprising:
decoding data transmitted from the transmitter to the first receiver using a scheme based on at least one of a limited-coordination zero-forcing (LCZF) decoding scheme, a minimum-mean-square-error (MMSE) decoding scheme, or a limited-coordination maximum-likelihood (LCML) decoding scheme, and the data is decoded based on the quantized first CSI, the quantized second CSI, and the quantized third CSI.

12. The method of claim 10, wherein the obtaining of the quantized second CSI further comprises:
obtaining the quantized second CSI by network-decoding the second network coding information and the quantized third CSI, in response to the reception of the second network coding information.

13. The method of claim 10, wherein the transmitting of the first network coding information further comprises:
broadcasting the first network coding information to enable the transmitter and the second receiver to receive the first network coding information.

14. The method of claim 10, further comprising:
receiving, from the second receiver, a quantized second reception signal, wherein the second reception signal is a signal that the second receiver receives from the transmitter.

15. A transmitter in a multiple-user multiple-input multiple-output (MU-MIMO) environment, the transmitter comprising:
a storage unit configured to store quantized first channel state information (CSI) and quantized second CSI, wherein the quantized first CSI and the quantized second CSI are each received during a first time period, the first CSI is CSI of a first channel that is established between the transmitter and a first receiver, and the second CSI is CSI of a second channel that is established between the transmitter and a second receiver;
a receiving unit configured to receive, from the first receiver, first network coding information as a single piece of binary data transmitted in a single transaction during a second subsequent time period, the first network coding information comprising the quantized first CSI and quantized third CSI being network-coded, and the third CSI being CSI of a third channel that is established between the first receiver and the second receiver; and
a processing unit configured to obtain the quantized third CSI based on an Exclusive-OR (XOR) operation between the first network coding information and the quantized first CSI received during the first time period.

16. The transmitter of claim 15, wherein the processing unit further comprises:
a path setting unit to determine a path used for transmitting data to the first receiver based on the quantized first CSI, the quantized second CSI, and the quantized third CSI.

17. The transmitter of claim 15, wherein the receiving unit receives the first network coding information in response to broadcasting of the first network coding information by the first receiver.

18. The transmitter of claim 15, wherein the processing unit further comprises:
a network decoding unit to obtain the quantized third CSI by network-decoding of the stored quantized first CSI and the first network coding information, in response to the reception of the first network coding information.

19. The transmitter of claim 15, wherein the processing unit further comprises:
a precoding unit to perform precoding of data to be transmitted to the first receiver and the second receiver, based on the quantized first CSI, the quantized second CSI, and the quantized third CSI.

20. The transmitter of claim 15, further comprising:
a transmitting unit to transmit a pilot signal to the first receiver to enable the first receiver to estimate the first CSI.

21. A first receiver in a multiple-user multiple-input multiple-output (MU-MIMO) environment, the first receiver comprising:
a network coding unit configured to generate first network coding information comprising quantized first channel state information (CSI) and quantized third CSI being network-coded, wherein the first CSI is CSI of a first channel that is established between a transmitter and the first receiver and the third CSI is CSI of a third channel that is established between the first receiver and a second receiver;
a transmitting unit configured to transmit the first network coding information to the transmitter and the second receiver;

a receiving unit configured to receive, by the first receiver from the second receiver, second network coding information generated by network-coding of quantized second CSI and the third CSI, wherein the second CSI is CSI of a second channel that is established between the transmitter and the second receiver; and a processing unit configured to obtain the quantized second CSI, at the first receiver, based on an Exclusive-OR (XOR) operation between the second network coding information and the quantized third CSI.

* * * * *